(12) United States Patent
Zang et al.

(10) Patent No.: US 11,895,104 B2
(45) Date of Patent: Feb. 6, 2024

(54) SERVICE PROCESSING METHOD AND APPARATUS BASED ON BLOCKCHAIN SYSTEM, MEDIUM AND ELECTRONIC DEVICE

(71) Applicant: TENCENT TECHNOLOGY (SHENZHEN) COMPANY LIMITED, Guangdong (CN)

(72) Inventors: Jun Zang, Shenzhen (CN); Jian Jun Zhang, Shenzhen (CN); Luo Hai Zheng, Shenzhen (CN); Jun Jie Shi, Shenzhen (CN); Hu Jia Chen, Shenzhen (CN); Zi Chao Tang, Shenzhen (CN); Yi Ge Cai, Shenzhen (CN); Qing Qin, Shenzhen (CN); Chuan Bing Dai, Shenzhen (CN); Hu Lan, Shenzhen (CN); Jin Long Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 465 days.

(21) Appl. No.: 17/235,188

(22) Filed: Apr. 20, 2021

(65) Prior Publication Data

US 2021/0243175 A1    Aug. 5, 2021

Related U.S. Application Data

(63) Continuation of application No. PCT/CN2020/072664, filed on Jan. 17, 2020.

(30) Foreign Application Priority Data

Jan. 29, 2019   (CN) .......................... 201910084819.3

(51) Int. Cl.
H04L 9/40        (2022.01)
G06Q 40/12       (2023.01)
H04L 9/32        (2006.01)

(52) U.S. Cl.
CPC ........... H04L 63/08 (2013.01); G06Q 40/123 (2013.12); H04L 9/3263 (2013.01); H04L 2209/56 (2013.01)

(58) Field of Classification Search
CPC ..... H04L 9/3263; H04L 9/3239; H04L 63/08; H04L 9/006; H04L 9/50; H04L 2209/56; H04L 63/0823; G06Q 40/123
(Continued)

(56) References Cited

U.S. PATENT DOCUMENTS

2015/0178493 A1*   6/2015  Liu ..................... H04L 63/0884
                                              726/6
2017/0093805 A1*   3/2017  Proulx ............... H04L 63/0876
(Continued)

FOREIGN PATENT DOCUMENTS

CN          102509401 A       6/2012
CN          107257340 A      10/2017
(Continued)

OTHER PUBLICATIONS

Office Action dated Jul. 4, 2022 issued by the Japanese Patent Office in Japanese Application No. 2021-520167.
(Continued)

*Primary Examiner* — Benjamin A Kaplan
(74) *Attorney, Agent, or Firm* — Sughrue Mion, PLLC (57) ABSTRACT

A service processing method, apparatus, and storage medium of a blockchain system are provided. The service processing method includes obtaining authentication information of a service participant; determining whether data in the authentication information of the service participant is
(Continued)

updated; generating, based on the data in the authentication information of the service participant being updated, a notification message according to the updated data; and transmitting the notification message to a service processing node subnetwork, the notification message instructing one or more service processing nodes in the service processing node subnetwork to process a service request according to updated authentication information of the service participant.

20 Claims, 7 Drawing Sheets

(58) Field of Classification Search
USPC .......................................................... 726/6
See application file for complete search history.

(56) References Cited

U.S. PATENT DOCUMENTS

| | | | |
|---|---|---|---|
| 2018/0101844 A1 | 4/2018 | Song et al. | |
| 2021/0243175 A1 | 8/2021 | Zang et al. | |
| 2022/0138741 A1* | 5/2022 | Alt | G06F 21/105 |
| | | | 705/71 |

FOREIGN PATENT DOCUMENTS

| | | |
|---|---|---|
| CN | 108830600 A | 11/2018 |
| CN | 108959278 A | 12/2018 |
| CN | 109165943 A | 1/2019 |
| CN | 109194493 A | 1/2019 |
| CN | 109636427 A | 4/2019 |
| CN | 109636492 A | 4/2019 |
| CN | 111553672 A | 8/2020 |
| JP | 2022-511616 A | 2/2022 |

OTHER PUBLICATIONS

Translation of the Written Opinion of the International Searching Authority dated Apr. 23, 2020 in PCT/CN2020/072664.
International Search Report of PCT/CN2020/072664 dated Apr. 23, 2020 [PCT/ISA/210].
Written Opinion of PCT/CN2020/072664 dated Apr. 23, 2020 [PCT/ISA/237].

* cited by examiner

FIG. 10

SERVICE PROCESSING METHOD AND APPARATUS BASED ON BLOCKCHAIN SYSTEM, MEDIUM AND ELECTRONIC DEVICE

CROSS-REFERENCE TO RELATED APPLICATION(S)

This application is a continuation of PCT/CN2020/072664 and claims priority to Chinese Patent Application No. 201910084819.3, entitled "SERVICE PROCESSING METHOD AND APPARATUS BASED ON BLOCKCHAIN SYSTEM, MEDIUM AND ELECTRONIC DEVICE" and filed with China National Intellectual Property Administration on Jan. 29, 2019, the disclosures of which are incorporated by reference herein in their entirety.

FIELD

The disclosure relates to the field of computer and communication technologies, and specifically, to a service processing based on a blockchain system.

BACKGROUND

Conventional service processing systems (for example, tax invoice systems) mainly rely on centralized processing, which may cause relatively low service processing efficiency. In the related art, a distributed deployment solution is provided to improve the processing capability and efficiency of the service processing system.

SUMMARY

One or more embodiments of the disclosure provide a service processing method and apparatus based on a blockchain system, a medium, and an electronic device, to ensure that service processing nodes can obtain relevant data for processing a service request in a timely manner while reducing the dependency on the concurrency capabilities of the service processing nodes, thereby improving processing efficiency of the service processing nodes.

Other features and advantages of the one or more embodiments will become more apparent from the following descriptions, or may be learned by practice of the one or more embodiments.

According to an embodiment, there is provided a service processing method for a blockchain system including an authentication management center, a service processing node subnetwork, and a service participant system. The service processing node subnetwork includes one or more service processing nodes that are deployed in a distributed manner to form a blockchain network. The service processing method is performed by the authentication management center. The service processing method includes: obtaining authentication information of a service participant; determining whether data in the authentication information of the service participant is updated; generating, based on the data in the authentication information of the service participant being updated, a notification message according to the updated data; and transmitting the notification message to the service processing node subnetwork, the notification message instructing the one or more service processing nodes in the service processing node subnetwork to process a service request according to updated authentication information of the service participant.

According to an embodiment, there is provided a service processing apparatus connected to a service processing node subnetwork and a service participant system in a blockchain system, the service processing node subnetwork including one or more service processing nodes that are deployed in a distributed manner to form a blockchain network. The service processing apparatus comprising: at least one memory storing computer program code; and at least one processor configured to access the at least one memory and operate as instructed by the computer program code. The computer program code includes: processing code configured to cause at least one processor to obtain authentication information of a service participant; generation code configured to cause at least one processor to determine whether data in the authentication information of the service participant is updated, and generate, based on the data in the authentication information of the service participant being updated, a notification message according to the updated data; and transmission code configured to cause at least one processor to transmit the notification message to the service processing node subnetwork, the notification message instructing the one or more service processing nodes in the service processing node subnetwork to process a service request according to updated authentication information of the service participant.

According to an embodiment, there is provided a non-transitory computer-readable storage medium storing at least one computer program code, the at least one computer program code, when executed by at least one processor causes at least the processor to: obtain authentication information of a service participant; determine whether data in the authentication information of the service participant is updated; generate, based on the data in the authentication information of the service participant being updated, a notification message according to the updated data; and transmit the notification message to a service processing node subnetwork, the notification message instructing one or more service processing nodes in the service processing node subnetwork to process a service request according to updated authentication information of the service participant.

In the technical solutions provided by the one or more embodiments of the disclosure, when data in the authentication information of the service participant is updated, the notification message is generated according to the updated data, and the notification message is transmitted to the service processing node subnetwork. On the one hand, the service processing nodes in the service processing node subnetwork can be notified in time when data is updated, ensuring that the service processing nodes can process the service request based on the latest authentication information. Furthermore, the updated data can be notified to the service processing nodes in an asynchronous notification manner, thereby avoiding an increase in processing load due to frequent communication between the service processing nodes and the authentication management center, reducing the dependency on the concurrency capabilities of the service processing nodes, and improving processing efficiency of the service processing nodes.

It may be understood that the above descriptions and the following detailed descriptions are merely explanatory purposes, and should not be construed as limitation to the one or more embodiments of the disclosure.

BRIEF DESCRIPTION OF THE DRAWINGS

The accompanying drawings constitute a part of the disclosure, and are used to provide more clear understanding of the one or more embodiments of the disclosure.

DESCRIPTION OF EMBODIMENTS

One or more embodiments are described more comprehensively with reference to the accompanying drawings. However, the embodiments can be implemented in various forms and are not construed as being limited to the examples provided herein.

In addition, the described characteristics, structures, or features may be combined in one or more embodiments in any appropriate manner. In the following descriptions, specific embodiments are provided to give a comprehensive understanding of the embodiments. However, a person of ordinary skill in the art may understand that, the technical solutions of the disclosure may be implemented without one or more of the particular details, or another method, unit, apparatus, or step may be used. Moreover, well-known methods, apparatuses, implementations, or operations are not shown or described in detail, to avoid obscuring aspects of this disclosure.

The block diagrams shown in the accompanying drawing are merely functional entities and do not necessarily correspond to physically independent entities. That is, the functional entities may be implemented in a software form, one or more hardware modules or integrated circuits, in different networks, processor apparatuses and/or microcontroller apparatuses.

The flowcharts shown in the accompanying drawings are merely exemplary, and the operations and/or steps shown thereof are not limited thereto. In addition, the operations and/or steps show in the flowcharts may be performed in different sequential orders or may be performed simultaneously. For example, some operations/steps may be further divided, while some operations/steps may be combined or partially combined. Therefore, an actual execution order may change according to an actual case.

Figure 1:
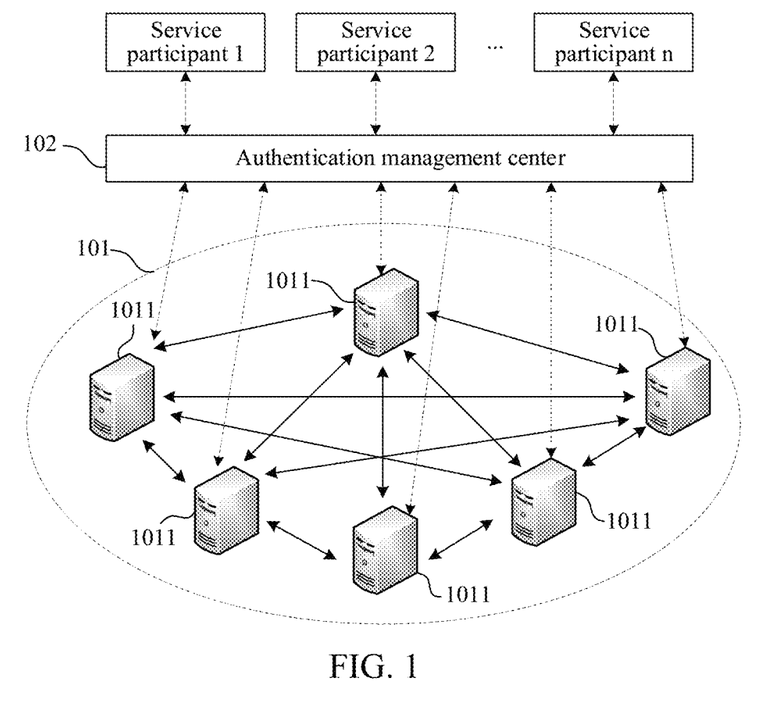
FIG. 1 is a schematic diagram of a system architecture for a blockchain network according to an embodiment.

FIG. 1 is a schematic diagram of a system architecture for a blockchain network according to an embodiment.

As shown in FIG. 1, the system architecture may include a service processing node subnetwork 101, an authentication management center 102, and a service participant system. The service participant system may be centrally deployed, and may include service participant 1, service participant 2, . . . , and service participant n shown in FIG. 1. The service processing node subnetwork 101 includes a plurality of service processing nodes 1011 that are deployed in a distributed manner to form a blockchain network.

In an embodiment, each service participant may transmit information to the authentication management center 102 for authentication. After the successful authentication, the authentication management center 102 may generate authentication information of the each service participant, for example, key information (for example, public key information and private key information) or digital certificate information of the service participant.

The service processing nodes 1011 in the service processing node subnetwork 101 may process a service request according to the authentication information of the service participant generated by the authentication management center. Accordingly, the authentication management center 102 may transmit the generated authentication information of the service participant to each service processing node 1011.

The service processing nodes 1011 may pull the latest authentication information of the service participant from the authentication management center 102. To ensure that the service processing nodes 1011 obtains the latest authentication information of the service participant without increasing the impact on the performance of the service processing nodes 1011, the authentication management center 102 may generate, upon detection that data in the authentication information of the service participant is updated, a notification message according to the updated data, and transmit, in a broadcasting manner, the notification message to the service processing nodes 1011 in the service processing node subnetwork, so that the service processing nodes process the service request according to the latest authentication information of the service participant. As such, the service processing nodes 1011 may not need to pull the latest authentication information of the service participants from the authentication management center 102 each time a service request is processed, thereby reducing the processing load on the service processing nodes 1011.

In an embodiment, because of the malfunctioning of the network or the failure of the service processing node 1011, the service processing node 1011 may not receive the notification message transmitted from the authentication management center 102. Therefore, after the authentication management center 102 transmits a notification message to the service processing nodes 1011, a target service processing node that does not receive the notification message may be determined. For example, if a response message indicating reception failure is received from one or more service processing nodes, it is determined that the one or more service processing nodes failed to receive the notification message. Alternatively, after the notification message is transmitted, if no response message from the one or more service processing nodes is received by the authentication management center 102 within a predetermined duration, it is determined that the one or more service processing nodes failed to receive the notification message.

In an embodiment, after the authentication management center 102 obtains the target service processing node that fails to receive the notification message, the notification message may be retransmitted to the target service processing node until the target service processing node successfully receives the notification message or a number of transmissions reaches a specified number of times.

In an embodiment, when the authentication management center 102 retransmits the notification message to the target service processing node, transmission may be performed at a predetermined interval. In addition, after the initial transmission of a notification message is performed and determined to be failed, the predetermined interval may increase as the number of transmissions increases, in order to avoid a problem of network congestion caused by frequent transmissions.

Figure 2:
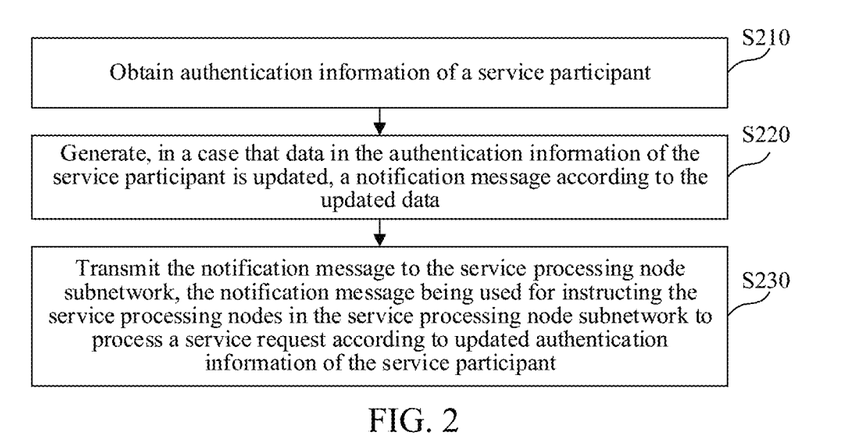
FIG. 2 is a flowchart of a service processing method based on a blockchain system according to an embodiment.

FIG. 2 is a flowchart of a service processing method based on a blockchain system according to an embodiment. As shown in FIG. 1, the blockchain system may include an authentication management center 102, a service processing node subnetwork 101, and a service participant system including a plurality of service participants 1 to n. The service processing node subnetwork 101 includes a plurality of service processing nodes 1011 that are deployed in a distributed manner to form a blockchain network. The service processing method based on a blockchain system may be performed by the authentication management center shown in FIG. 1. Referring to FIG. 2, the service processing method based on a blockchain system includes at least steps S210 to S230.

In step S210, the authentication management center may obtain authentication information of a service participant.

In an embodiment, the authentication information of the service participant may be generated according to information of the service participant. The information of the service participant may include a type of the service participant, identification information of the service participant, and the like. Before the authentication information of the service participant is generated according to the information of the service participant, authentication may be performed on the service participant according to the information of the service participant, and after the authentication succeeds, the authentication information of the service participant is generated.

In an embodiment, the authentication information of the service participant may include key information (for example, public key information and private key information), or digital certificate information of the service participant.

For example, in the field of tax management, the service participants may be a taxation authority management system, an enterprise tax agency service provider system, and an enterprise tax management system. The taxation authority management system is a system used by a taxation authority to manage an enterprise and an enterprise tax agency service provider, a registration process of the enterprise and the enterprise tax agency service provider, query information of the enterprise and the enterprise tax agency service provider, and permissions of the enterprise and the enterprise tax agency service provider. The enterprise tax agency service provider system is a system used by the enterprise tax agency service provider to manage an enterprise served by the enterprise tax agency service provider, for example, add or delete an enterprise being managed. The enterprise tax management system is a system for tax processing by an enterprise, for example, select or change an enterprise tax agency service provider or change information of an issued invoice.

Moreover, if the service participant is an enterprise tax agency service provider, a process of generating the authentication information of the service participant may include performing authentication on the enterprise tax agency service provider first according to the information of the enterprise tax agency service provider. After the authentication succeeds, one or more of the following authentication information of the enterprise tax agency service provider may be generated and stored. For example, the authentication information may include a digital certificate of the enterprise tax agency service provider, a blockchain address of the enterprise tax agency service provider, and key data of the enterprise tax agency service provider.

In an embodiment, if the service participant is an enterprise, a process of generating the authentication information of the service participant may include performing authentication on the enterprise first according to the information of the enterprise, and after the authentication succeeds, generating one or more of the following authentication information of the enterprise: a digital certificate of the enterprise, a blockchain address of the enterprise, and key data of the enterprise. However, the authentication information is not limited to the information described above, but may include any other information that may relate to an authentication process of the service participant.

In an embodiment, a process of generating the authentication information of the service participant may further include generating, according to information of an enterprise tax agency service provider and information of an enterprise for whom the enterprise tax agency service provider serves as a tax agency, an agency relationship between the enterprise tax agency service provider and the enterprise.

In step S220, the authentication management center may generate, in a case that data in the authentication information of the service participant is updated, a notification message according to the updated data.

When the information of the service participant is changed, the authentication information of the service participant is also changed or updated. In addition, if a new service participant is added or the service participant is deleted, the stored authentication information of the service participant is also changed or updated.

In an embodiment, generating the notification message according to the updated data may include adding the updated data to a data message to generate a notification message data packet.

When the system runs for the first time, authentication information is generated according to existing service participants. Here, the authentication information may be the updated data, and the notification message is generated according to the updated data. In the subsequent operation of the system, the information of the service participants may change, and a service participant may be added or deleted. Accordingly, the updated data is the information that is changed, and the notification message is generated according to the information that is changed.

For example, in the field of tax management, the service participants may be the taxation authority management system, the enterprise tax agency service provider system, and the enterprise tax management system. Therefore, when the following information is detected, it may be determined that data in the authentication information of the service participants is updated: a message that the enterprise tax agency service provider changes the information of the enterprise served, a message that the enterprise changes the enterprise tax agency service provider hired, a message that a taxation authority changes permissions of the enterprise tax agency service provider or the enterprise, and a message that the information of the enterprise tax agency service provider or the enterprise is changed.

Still referring to FIG. 2, at step S230, the authentication management center may transmit the notification message to the service processing node subnetwork, the notification message being used for instructing the service processing nodes in the service processing node subnetwork to process a service request according to updated authentication information of the service participant.

In an embodiment, the authentication management center needs to maintain the information of the service processing nodes in the service processing node subnetwork, so that the notification message is transmitted to the service processing nodes according to the maintained information of the service processing nodes after the notification message is generated. For example, the authentication management center obtains and stores the information of the service processing nodes in the service processing subnetwork first. If a request for service processing node adding information is received, information of a newly added service processing node is registered and recorded in a storage or a database of the authentication management center. If a request for deletion of information for a specific service processing node is received, the information of the specific service processing node is unregistered and deleted from the storage.

Figure 3:
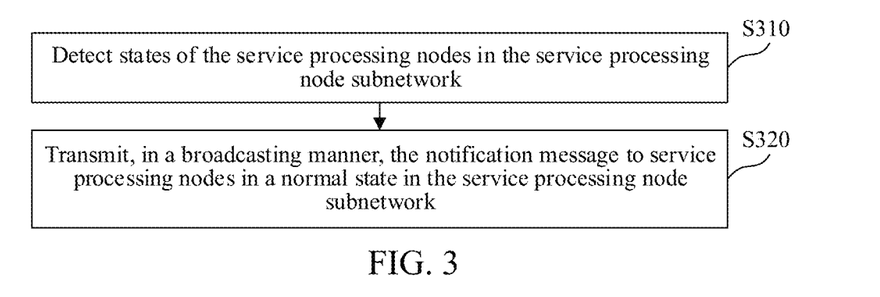
FIG. 3 is a flowchart of transmitting, in a broadcasting manner, a notification message to service processing nodes in a service processing node subnetwork according to an embodiment.

FIG. 3 is a flowchart of transmitting, in a broadcasting manner, a notification message to service processing nodes in a service processing node subnetwork according to an embodiment.

Referring to FIG. 3, a process of transmitting the notification message to the service processing node subnetwork includes the following steps:

In step S310, the authentication management center may detect states of one or more service processing nodes in the service processing node subnetwork.

In an embodiment, the authentication management center may detect the states of the service processing nodes by transmitting a heartbeat packet to the service processing nodes. The states of the service processing nodes include a normal state and an abnormal state. The normal state is a state in which the one or more service processing nodes can receive a message transmitted from the authentication management center, and the abnormal state is a state in which a message transmitted from the authentication management center cannot be received by the one or more service processing nodes (for example, due to a node fault and communication interruption).

In step S320, the authentication management center may transmit, in a broadcasting manner, the notification message to the one or more service processing nodes in a normal state in the service processing node subnetwork.

In an embodiment, in response to a detection that a service processing node in the abnormal state in the service processing node subnetwork returns to the normal state, the notification message may be transmitted to the service processing node that returns to the normal state.

In an embodiment, the process of transmitting the notification message to the service processing node subnetwork may further include transmitting the notification message to the one or more service processing nodes in the service processing node subnetwork, and then forwarding, by the one or more service processing nodes, the notification message to other service processing nodes. In other words, the notification message may be transmitted from one service processing node to another service processing node.

In an embodiment, after each service processing node receives the notification message transmitted by the authentication management center, the latest authentication information of the service participant may be obtained according to the notification message, and the authentication information may be buffered, so that when a service request is received, the service request is processed according to the buffered authentication information.

Figure 4:
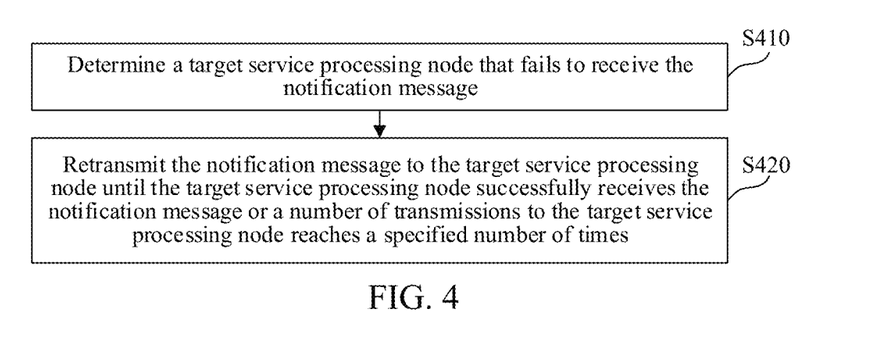
FIG. 4 is a flowchart of a service processing method based on a blockchain system according to an embodiment.

FIG. 4 is a flowchart of a service processing method based on a blockchain system according to an embodiment.

Referring to FIG. 4, after the notification message is transmitted to the service processing node subnetwork, the following steps may further be included:

In step S410, the authentication management center may determine a target service processing node that fails to receive the notification message.

In an embodiment, a process of determining a target service processing node that fails to receive the notification message includes detecting whether reception response information fed back by the service processing node in the service processing node subnetwork for the notification message is received. Based on the reception failure information fed back by a first service processing node in the service processing node subnetwork for the notification message, and/or no reception response information fed back by a second service processing node in the service processing node subnetwork for the notification message within a predetermined duration, the first service processing node and/or the second service processing node may be determined as the target service processing nodes.

In step S420, the authentication management center may retransmit the notification message to the target service processing node until the target service processing node successfully receives the notification message or a number of transmissions to the target service processing node reaches a predetermined threshold.

In an embodiment, a process of retransmitting the notification message to the target service processing node may be retransmitting the notification message to the target service processing node after a preset time period, in order to avoid network congestion caused by immediate retransmission of the notification message after the transmission of the notification message fails.

A preset time period may be in a positive correlation with the number of times of retransmitting the notification message to the target service processing node, that is, as the number of retransmissions increases, an interval between the retransmissions of notification messages may increase after the transmission failure is determined, thereby effectively avoiding a problem of increasing network transmission load caused by frequent transmissions.

In an embodiment, when the number of transmissions to the target service processing node reaches a predetermined threshold, but the target service processing node still fails to receive the notification message, a control instruction may be transmitted to a proxy node connected to the service processing node subnetwork, to enable the proxy node to shield an external service capability of the target service processing node according to the control instruction.

In an embodiment, shielding the external service capability of the target service processing node by the proxy node may be forwarding, when the service request is received, the service request to another service processing node rather than the target service processing node for processing.

In the technical solutions of the one or more embodiments, the service processing nodes in the service processing node subnetwork can be notified in time when data is updated, thereby ensuring that the service processing nodes can process the service request based on the latest authentication information, and avoiding an increase in processing load due to frequent communication between the service processing nodes and the authentication management center, reducing the dependency on the concurrency capabilities of the service processing nodes, and improving processing efficiency of the service processing nodes.

Using a tax system as an example. The implementation details of the technical solutions in the embodiments are described in detail in the following with reference to FIG. 5 to FIG. 7.

Figure 5:
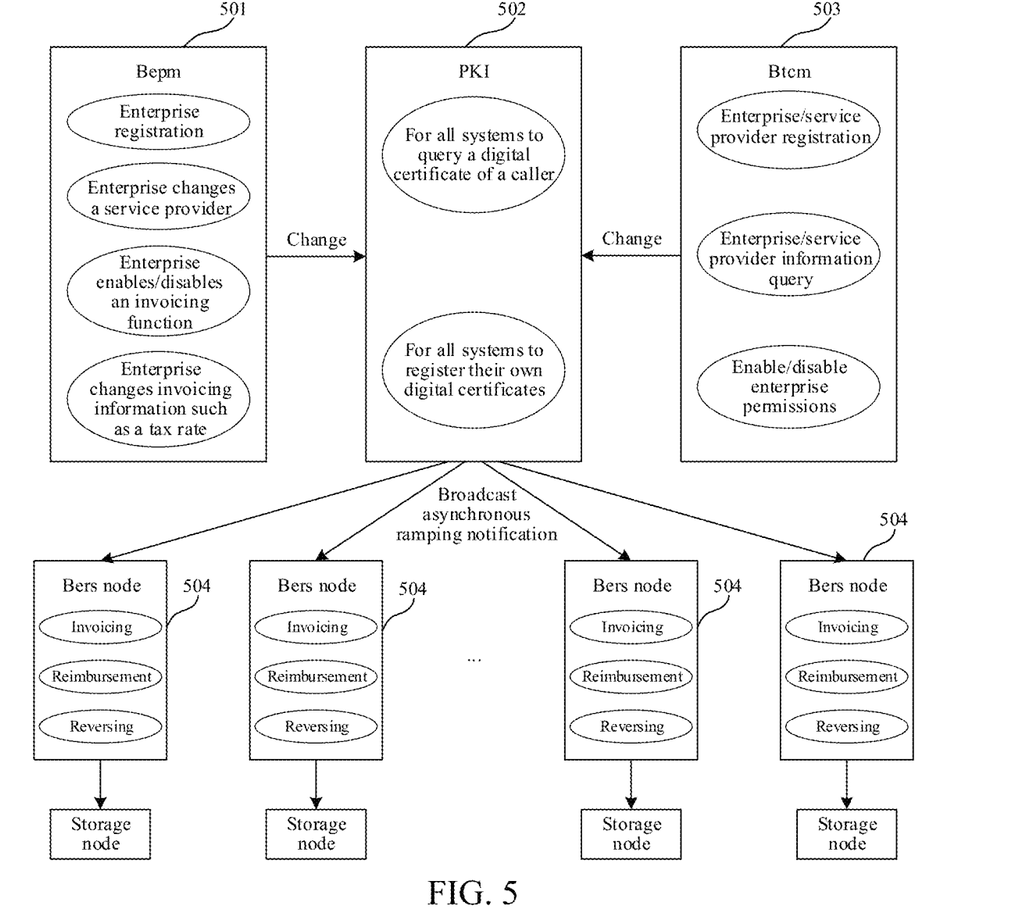
FIG. 5 is a schematic architectural diagram of a blockchain electronic invoice system according to an embodiment.
Figure 6:
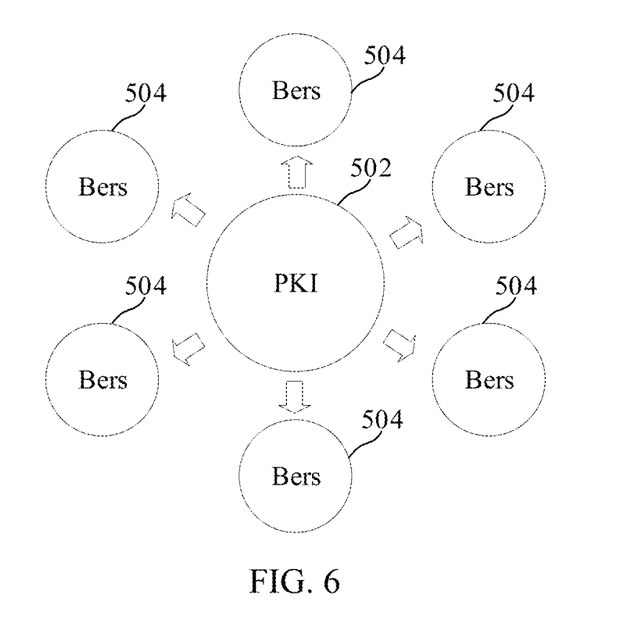
FIG. 6 is a schematic diagram of a relationship between PKI and nodes Bers according to an embodiment.
Figure 7:
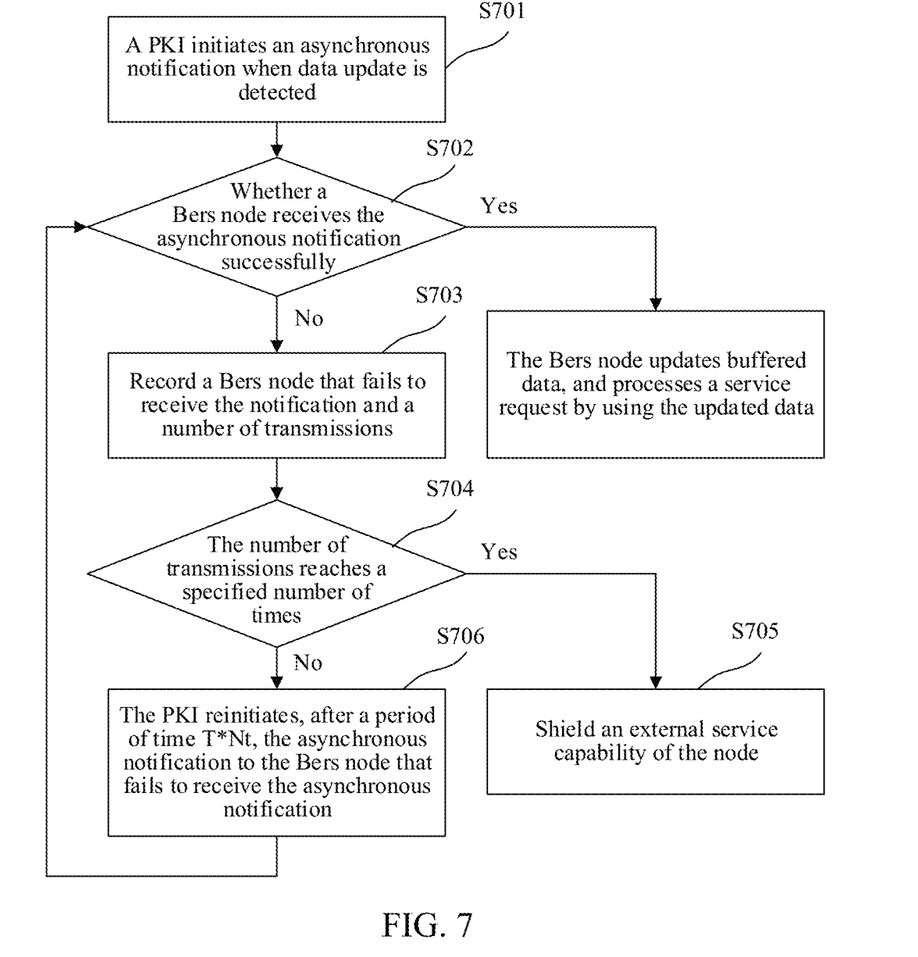
FIG. 7 is a flowchart of a broadcast asynchronous ramping notification mechanism according to an embodiment.

FIG. 5 is a schematic architectural diagram of a blockchain electronic invoice system according to an embodiment. FIG. 6 is a schematic diagram of a relationship between PKI and nodes Bers according to an embodiment. FIG. 7 is a flowchart of a broadcast asynchronous ramping notification mechanism according to an embodiment.

Referring to FIG. 5, a blockchain electronic invoice system according to an embodiment includes: a public key infrastructure (PKI) 502, a blockchain electronic platform management (Bepm) node 501, a blockchain tax chain management (Btcm) node 503, and blockchain electronic receipt service (Bers) nodes 504.

In an embodiment, the PKI 502 is a centralized infrastructure that provides a security service for communication between nodes of a blockchain by following standard norms and techniques of using a public key encryption technology to provide a secure basic platform for the development of e-commerce. The PKI 502 may be an aggregate of all software and hardware related to the creation, issuance, management, and logout of public key digital certificates. A core element of the PKI 502 is a digital certificate, and an executor is a certificate authority (CA) authentication agency. For example, the PKI 502 may be a Tencent PKI (TPKI, that is, a PKI architecture formulated by Tencent). The Bers nodes 504, deployed in a distributed manner, are used for processing blockchain electronic invoice service data and providing interfaces such as invoicing, reimbursement, reversing, and query. The Btcm node 503, deployed in a centralized manner, is used for providing a taxation administrator with functions such as registration of an enterprise/service provider, invoicing management, global invoice query statistics, invoice tracking, invoice locking, and processing of exceptions such as loss of a merchant private key. The Bepm node 501, deployed in a centralized manner, is used for providing functions such as application access, public and private key management, invoicing/reimbursement data query statistics, and invoice tracking to an enterprise that intends to access the blockchain electronic invoice system. Storage nodes shown in FIG. 5 are underlying implementation of the blockchain, and are used for storing blockchain data. The storage node may be compatible with a MySQL (a relational database management system) protocol, and support a plurality of consensus algorithms.

In an embodiment, an electronic invoice is a traceable digital asset that cannot be tampered with. In other words, the electronic invoice has the same legal effect as a current paper invoice. The enterprise is an enterprise entity of the electronic invoice service. Different enterprise entities are distinguished according to taxpayer identification numbers. The enterprises are divided into invoicing enterprises and reimbursement enterprises according to related invoice functions. The service provider is a service entity of the electronic invoice service, and provides function services such as invoicing, reimbursement, and reversing for the enterprise.

In an embodiment, the blockchain electronic invoice system completes management such as enterprise access and registration, approval, and authentication of the service provider by using the PKI 502 infrastructure. After the authentication succeeds, the PKI 502 generates virtual identifiers of the enterprise and the service provider for accessing the blockchain service, such as public and private keys and account addresses of the enterprise and the service provider, and generates digital certificates of the enterprise and the service provider of the blockchain electronic invoice.

In an embodiment, before performing operations such as invoicing, reimbursement, reversing, and query, the Bers nodes 504 in the blockchain electronic invoice system may first obtain the digital certificates of the enterprise and the service provider, and query an agency relationship between the enterprise and the service provider. To improve concurrent processing performance, the nodes Bers 504 deployed in a distributed manner have to avoid frequent service interaction with modules such as the PKI 502. Therefore, relevant data of the enterprise and the service provider needs to be buffered.

In an embodiment, when data of the enterprise and the service provider in the PKI 502 changes, and if one or more Bers nodes 504 fail to detect the change in the data and still use historical data buffered by the one or more Bers nodes 504 to perform service operations, an execution result may be incorrect. Therefore, the PKI 502 may asynchronously transmit the change of content to the Bers nodes 504 by using a broadcast asynchronous ramping notification mechanism. If the notification succeeds (e.g., the one or more Bers nodes 504 successfully receives the change of content through a notification), the Bers node 504 automatically updates the buffered data, and performs the service operation by using the new data. If the notification fails, the PKI 502 reinitiates an asynchronous notification by using the ramping mechanism until the notification succeeds. If the notification still fails after being reinitiated for a threshold number of times, the PKI 502 may consider that the node is abnormal, and may shield an external service capability of the node and generate a system warning. It can be learned that the technical solutions of the embodiments may reduce interactions between the Bers node and the centrally deployed PKI 502, thereby improving a concurrent processing capability of the Bers node.

FIG. 6 is a schematic diagram of a relationship between PKI and nodes Bers according to an embodiment Referring to FIG. 6, the PKI 502 maintains information of all Bers nodes 504 in the blockchain, and the PKI 502 detects a state of each Bers node 504. For example, a heartbeat packet is transmitted to the Bers node 504 to detect whether feedback of the Bers node is received. If the feedback of the Bers node 504 is received, it may indicate that the Bers node is in a normal state. Alternatively, if no feedback of the Bers node is received, it may indicate that the Bers node is in an abnormal state.

In an embodiment, if a detection performed by the PKI 502 fails due to a fault of a Bers node 504 or a network, the PKI 502 logically unregister the Bers node 504 and initiates a warning. If the Bers node 504 recovers from a fault and the PKI 502 succeeds in the detection, the PKI 502 logically adds the Bers node, and notifies relevant data to the newly added Bers node.

In an embodiment, when determining that data of the enterprise and the service provider is updated, the PKI 502 notifies Bers nodes in the normal state in a broadcasting manner. Moreover, when a new Bers node is added, the PKI 502 registers and records information of the Bers node that is newly added. When a Bers node is deleted, the PKI 502 unregisters and deletes information of the Bers node.

FIG. 7 is a flowchart of a broadcast asynchronous ramping notification mechanism according to an embodiment. In an embodiment, a specific process of the foregoing broadcast asynchronous ramping notification mechanism is shown in FIG. 7, and includes the following steps:

In step S701, a PKI may initiate an asynchronous notification when data update is detected. That is, when the PKI detects data update, a first asynchronous notification is initiated to Bers nodes deployed in a distributed manner.

In step S702, the PKI may determine whether a Bers node successfully receives the notification. If a Bers node successfully receives the notification (S702: Yes), the Bers node updates buffered data, and processes a service request by using the updated data. However, if the Bers node fails to receive the notification (S702: No), S703 is performed.

In an embodiment, after the asynchronous notification is initiated, if no result is returned or the return fails within a predetermined duration, it is determined that the Bers node fails to receive the notification.

In step S703, the PKI may record the Bers node that fails to receive the notification and a number of transmissions.

In step S704, the PKI may determine whether the number of transmissions reaches a specified number of times (or a predetermined threshold). If the number of transmissions reach the specified number of times (S704: Yes), S705 is performed. If not, S706 is performed.

In step S705, the PKI may shield an external service capability of the node. That is, after the number of transmissions reaches the specified number of times, if the Bers node still fails to receive the notification, the external service capability of the node may be shielded, the Bers node may be identified as faulty, and a system abnormal warning is initiated. Shielding the external service capability of the node may be transmitting a notification message to a proxy node connected to the Bers node, so that when receiving a service request, the proxy node does not forward the service request to the Bers node for processing.

In step S706, the PKI reinitiates, after a period of time T*Nt, the asynchronous notification to the Bers node that fails to receive the notification, and returns to S702.

Figure 8:
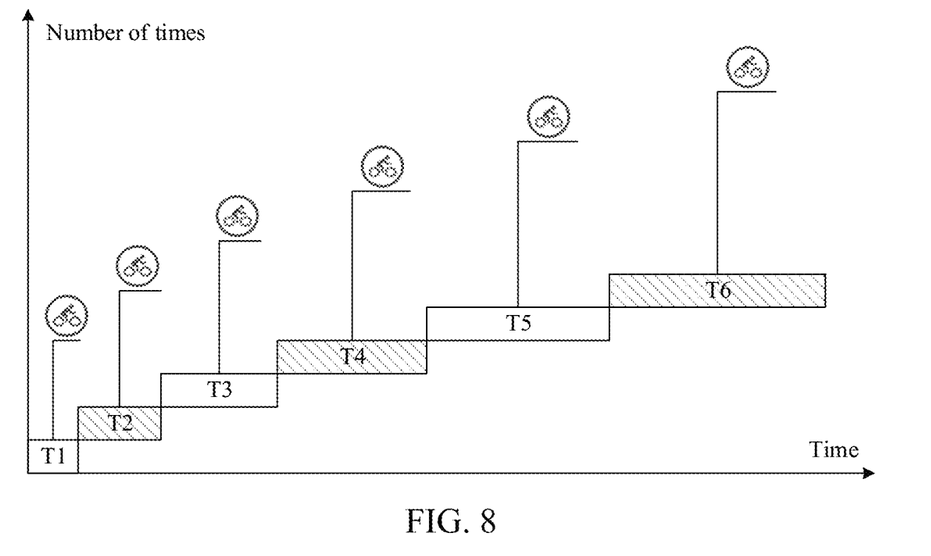
FIG. 8 is a schematic diagram illustrating a relationship between the number of transmission versus time according to an embodiment.

In an embodiment, when the PKI determines that the Bers node fails to receive the notification, retransmission may be performed after a period of time T*Nt, where Nt may be increased as the number of transmissions increases. Specifically, as shown in FIG. 8, as the number of transmissions increases, the PKI waits for a longer time after determining that the Bers node fails to receive the notification (because the waiting time increases each time, a time T1 of first transmission and waiting<a time T2 of second transmission and waiting<a time T3 of third transmission and waiting<a time T4 of fourth transmission and waiting< . . . ), thereby effectively avoiding a problem of increasing network transmission load caused by frequent transmissions.

The following describes apparatus embodiments of the disclosure, and the apparatus embodiments may be used for performing the service processing method based on a blockchain system described in the foregoing embodiments.

Figure 9:
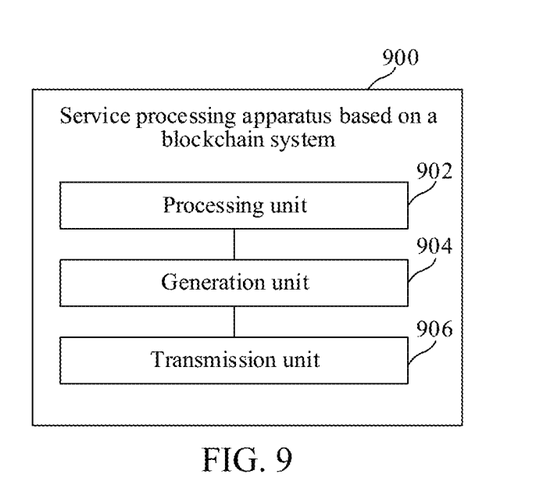
FIG. 9 is a block diagram of a service processing apparatus based on a blockchain system according to an embodiment.

FIG. 9 is a block diagram of a service processing apparatus based on a blockchain system according to an embodiment.

The blockchain system includes an authentication management center, a service processing node subnetwork, and a service participant system. The service processing node subnetwork includes a plurality of service processing nodes that are deployed in a distributed manner to form a blockchain network. The service processing apparatus is disposed in the authentication management center. It is to be understood that the service processing apparatus may be a computer program (including program code) that runs on a computer device. For example, the service processing apparatus is application software, and the apparatus may be configured to perform the corresponding steps in the method provided in the embodiments of this application.

Referring to FIG. 9, a service processing apparatus 900 based on a blockchain system is provided and may include a processing unit 902, a generation unit 904, and a transmission unit 906.

The processing unit 902 is configured to obtain authentication information of a service participant. The generation unit 904 is configured to generate, based on data in the authentication information of the service participant being updated, a notification message according to the updated data. The transmission unit 906 is configured to transmit the notification message to the service processing node subnetwork, the notification message being used for instructing the service processing nodes in the service processing node subnetwork to process a service request according to updated authentication information of the service participant.

In an embodiment, the service processing apparatus 900 based on a blockchain system further includes: an obtaining unit configured to determine a target service processing node that fails to receive the notification message after the transmission unit 906 transmits the notification message to the service processing node subnetwork. The transmission unit 906 is further configured to retransmit the notification message to the target service processing node until the target service processing node successfully receives the notification message or a number of transmissions to the target service processing node reaches a specified number of times.

In an embodiment, the obtaining unit is configured to, based on reception failure information fed back by a first service processing node in the service processing node subnetwork being received, determine the first service processing node as the target service processing node, and based on no reception response information fed back by the second service processing node for the notification message being received in a predetermined duration, determine the second service processing node as the target service processing node.

In an embodiment, the transmission unit 906 is further configured to retransmit the notification message to the target service processing node after a preset time period.

A preset time period may be in a positive correlation with a number of times of retransmitting the notification message to the target service processing node.

In an embodiment, the transmission unit 906 is further configured to transmit, based on the number of transmissions to the target service processing node reaching the specified number of times and the target service processing node still failing to receive the notification message, a control instruction to a proxy node connected to the service processing node subnetwork, to enable the proxy node to shield an external service capability of the target service processing node according to the control instruction.

In an embodiment, the transmission unit 906 is configured to: detect states of the service processing nodes in the service processing node subnetwork, and transmit, in a broadcasting manner, the notification message to a service processing node in a normal state in the service processing node subnetwork.

In an embodiment, the transmission unit 906 is further configured to transmit, in response to detection that a service processing node in an abnormal state in the service processing node subnetwork returns to the normal state, the notification message to the service processing node that returns to the normal state.

In an embodiment, the service processing apparatus 900 based on a blockchain system further includes a management unit configured to register and record, based on service processing node adding information being received, information of a newly added service processing node according to the adding information. The management unit is further configured to unregister and delete, based on deletion information for a specific service processing node being received, information of the specific service processing node according to the deletion information.

In an embodiment, the service participant system may include any one or more of a taxation authority management system, an enterprise tax agency service provider system, and an enterprise tax management system. The service processing node includes a tax processing node.

In an embodiment, the processing unit 902 is configured to, based on the service participant including an enterprise tax agency service provider, authenticate the enterprise tax agency service provider according to information of the enterprise tax agency service provider, and generate, after the authentication succeeds, one or more of the following authentication information of the enterprise tax agency service provider, such as a digital certificate of the enterprise tax agency service provider, a blockchain address of the enterprise tax agency service provider, and key data of the enterprise tax agency service provider. The processing unit 902 may be further configured to, based on the service participant including an enterprise, authenticate the enterprise according to information of the enterprise, and generate, after the authentication succeeds, one or more of the following authentication information of the enterprise, such as a digital certificate of the enterprise, a blockchain address of the enterprise, and key data of the enterprise. The processing unit 902 may be further configured to, based on the service participant including an enterprise tax agency service provider and an enterprise, generate and store an agency relationship between the enterprise tax agency service provider and the enterprise according to information of the enterprise tax agency service provider and information of the enterprise for whom the enterprise tax agency service provider serves as a tax agency.

In an embodiment, the generation unit 904 is configured to: determine, based on any one or a combination of the following information being detected, that data in the authentication information of the service participant is updated. For example, data in the authentication information of the service participant may be determined as updated when receiving a message indicating that the enterprise tax agency service provider changes the information of the enterprise served, a message indicating that the enterprise changes the enterprise tax agency service provider hired, a message indicating that a taxation authority changes permissions of the enterprise tax agency service provider or the enterprise, and a message indicating that the information of the enterprise tax agency service provider or the enterprise is changed.

Figure 10:
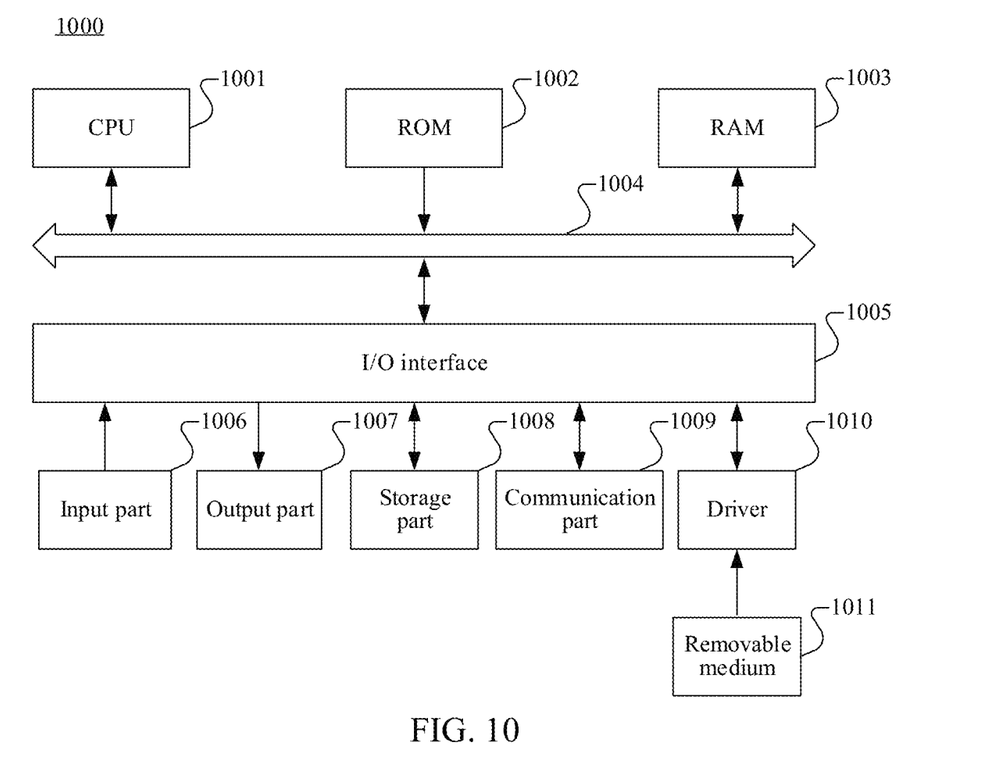
FIG. 10 is a structural diagram illustrating a computer system according to an embodiment.

FIG. 10 is a structural diagram of a computer system according to an embodiment.

A computer system 1000 of the electronic device shown in FIG. 10 is merely an example, and does not constitute any limitation on functions and use range of the embodiments.

As shown in FIG. 10, the computer system 1000 includes a central processing unit (CPU) 1001 or at least one processor, which may perform various suitable actions and processing based on a program stored in a read-only memory (ROM) 1002 or a program loaded from a storage part 1008 into a random access memory (RAM) 1003, for example, perform the method described in the foregoing embodiments. The RAM 1003 further stores various programs and data required for system operations. The CPU 1001, the ROM 1002, and the RAM 1003 are connected to each other through a bus 1004. An input/output (I/O) interface 1005 is also connected to the bus 1004.

The following components are connected to the I/O interface 1005: an input part 1006 including a keyboard, a mouse, or the like, an output part 1007 including a cathode ray tube (CRT), a liquid crystal display (LCD), a speaker, or the like, a storage part 1008 including a hard disk, or the like, and a communication part 1009 including a network interface card such as a local area network (LAN) card or a modem. The communication part 1009 performs communication processing via a network such as the Internet. A driver 1010 is also connected to the I/O interface 1005. A removable medium 1011, such as a magnetic disk, an optical disc, a magneto-optical disk, or a semiconductor memory, may be installed on the drive 1010, so that a computer program read from the removable medium is installed into the storage part 1008.

Particularly, according to the embodiments, the processes described in the following by referring to the flowcharts may be implemented as computer software programs. For example, the one or more embodiments may be implemented as a computer program product. The computer program product may include a computer program carried on a computer-readable medium, and the computer program includes program code used for performing the methods according to the one or more embodiments. The computer program may be downloaded and installed from a network through the communication part 1009, and/or installed from the removable medium 1011. When the computer program is executed by the CPU 1001, the various functions described in the one or more embodiments may be executed.

Further, the computer program product may include instructions, when run on a computer, causing the computer to perform the method according to the foregoing embodiments.

The computer-readable medium shown in the embodiments of this application may be a non-transitory computer-readable storage medium. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disc read-only memory (CD-ROM), an optical storage device, a magnetic storage device, or any appropriate combination thereof. The computer-readable storage medium may be any tangible medium containing or storing a program, and the program may be used by or used in combination with an instruction execution system, apparatus, or device. The computer readable medium may send, propagate, or transmit a program that is used by or used in combination with an instruction execution system, apparatus, or device. The program code included in the computer-readable medium may be transmitted by using any suitable medium, including but not limited to, a wireless network, a wired network, or the like, or any suitable combination thereof.

The flowcharts and block diagrams in the accompanying drawings illustrate possible system architectures, functions, and operations that may be implemented by a system, a method, and a computer program product according to various embodiments of the disclosure. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram or a flowchart and a combination of boxes in the block diagram or the flowchart may be implemented by using a dedicated hardware-based system configured to perform a designated function or operation, or may be implemented by using a combination of dedicated hardware and a computer instruction.

The term "unit" described in the embodiments may be implemented in a software manner, or may be implemented in a hardware manner, and the unit described can also be set in a processor. Names of the units do not constitute a limitation on the units in a specific case.

According to another aspect, this application further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

Although a plurality of modules or units of a device as shown as separate parts, such a division may not be necessary. It should be understood that features and functions of two or more modules or units described above may be specifically implemented in one module or unit. Conversely, features and functions of one module or unit described above may be further divided into a plurality of modules or units for implementation.

Through the descriptions of the foregoing implementations, a person skilled in the art would understand that the example embodiments described herein may be implemented through software, or may be implemented through software located in combination with necessary hardware. Therefore, the technical solutions of the embodiments may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this application.

The term used in the one or more embodiments of the disclosure such as "unit" or "module" indicates a unit for processing at least one function or operation, and may be implemented in hardware, software, or in a combination of hardware and software.

The term "unit" or "module" may be implemented by a program that is stored in an addressable storage medium and executable by a processor.

For example, the term "unit" or "module" may include software components, object-oriented software components, class components and task components, processes, functions, attributes, procedures, subroutines, segments of a program code, drivers, firmware, microcode, circuitry, data, databases, data structures, tables, arrays, and/or variables.

The foregoing embodiments have been shown and described with respect to the accompanying drawings. It should be understood that a person skilled in the art may make modifications, improvements, substitutions and equivalents thereof, from the foregoing embodiments.

It is to be understood that the one or more embodiments are not limited to the precise structures described above and shown in the accompanying drawings, and various modifications, improvements, substitutions and equivalents thereof may be made without departing from the scope of the disclosure, and the protection scope of the disclosure is subject to the appended claims.

What is claimed is:

1. A service processing method for a blockchain system including an authentication management center, a service processing node subnetwork, and a service participant system, the service processing node subnetwork including one or more service processing nodes that are deployed in a distributed manner to form a blockchain network, the service processing method being performed by the authentication management center, the service processing method comprising:
   obtaining authentication information of a service participant;
   determining whether data in the authentication information of the service participant is updated;
   generating, based on the data in the authentication information of the service participant being updated, a notification message according to the updated data; and
   transmitting the notification message to the service processing node subnetwork, the notification message instructing the one or more service processing nodes in the service processing node subnetwork to process a service request according to updated authentication information of the service participant.

2. The service processing method according to claim 1, wherein the transmitting the notification message to the service processing node subnetwork further comprises:
   determining a target service processing node, among the one or more service processing nodes, that fails to receive the notification message; and
   retransmitting the notification message to the target service processing node until the target service processing node receives the notification message or a number of transmissions to the target service processing node reaches a predetermined threshold.

3. The service processing method according to claim 2, wherein the service processing node subnetwork comprises a first service processing node and a second service processing node, and
   wherein the determining the target service processing node that fails to receive the notification message comprises:
   determining the first service processing node as the target service processing node based on receiving reception failure information fed back from the first service processing node in response to the transmitted notification message; and
   determining the second service processing node as the target service processing node based on no reception response information being fed back from the second service processing node in response to the transmitted notification message within a predetermined duration.

4. The service processing method according to claim 2, wherein the retransmitting the notification message to the target service processing node comprises:
   retransmitting the notification message to the target service processing node after a preset time period.

5. The service processing method according to claim 4, wherein the preset time period is in a positive correlation with a number of times of retransmitting the notification message to the target service processing node.

6. The service processing method according to claim 2, further comprising:
   transmitting, based on the number of transmissions to the target service processing node reaching the predetermined threshold and the target service processing node failing to receive the notification message, a control instruction to a proxy node connected to the service processing node subnetwork to enable the proxy node to shield an external service capability of the target service processing node according to the control instruction.

7. The service processing method according to claim 1, wherein the transmitting the notification message to the service processing node subnetwork comprises:
   detecting states of the one or more service processing nodes in the service processing node subnetwork; and
   transmitting, in a broadcasting manner, the notification message to service processing nodes in a normal state in the service processing node subnetwork.

8. The service processing method according to claim 7, further comprising:
   transmitting, in response to detecting that a service processing node in an abnormal state in the service processing node subnetwork returning to the normal state, the notification message to the service processing node that returns to the normal state.

9. The service processing method according to claim 1, further comprising:
   registering and recording, based on the one or more service processing nodes adding first information to the authentication information, the first information of the one or more service processing nodes according to the adding information; and
   unregistering and deleting, based on second information being deleted from the authentication information for the one or more service processing nodes, the second information of the one or more service processing nodes according to the second information.

10. The service processing method according claim 1, wherein the one or more service processing nodes comprise taxation authority processing nodes, and the service participant system comprises any one more of a taxation authority management system, an enterprise tax agency service provider system, and an enterprise tax management system.

11. The service processing method according to claim 10, wherein the obtaining the authentication information of the service participant comprises:
   based on the service participant being an enterprise tax agency service provider, authenticating the enterprise tax agency service provider according to information of the enterprise tax agency service provider, and
   generating, after the authentication succeeds, the authentication information of the enterprise tax agency service provider including a digital certificate of the enterprise tax agency service provider, a blockchain address of the enterprise tax agency service provider, and key data of the enterprise tax agency service provider;
   based on the service participant being an enterprise, authenticating the enterprise according to information of the enterprise, and
   generating, after the authentication succeeds, the authentication information of the enterprise including a digital certificate of the enterprise, a blockchain address of the enterprise, and key data of the enterprise; and
   generating and storing, based on the service participant being an enterprise tax agency service provider and an enterprise, an agency relationship between the enterprise tax agency service provider and the enterprise according to information of the enterprise tax agency service provider and information of the enterprise for whom the enterprise tax agency service provider serves as a tax agency.

12. The service processing method according to claim 10, wherein the determining whether the data in the authentication information of the service participant is updated further comprises:
   determining that the authentication information of the service participant is updated based on detecting third information in the service participant, the third information including:
   a message that the enterprise tax agency service provider changes information of the enterprise served, a message that the enterprise changes the enterprise tax agency service provider hired, a message that a taxation authority changes permissions of the enterprise tax agency service provider or the enterprise, and a message that the information of the enterprise tax agency service provider or the enterprise is changed.

13. A service processing apparatus connected to a service processing node subnetwork and a service participant system in a blockchain system, the service processing node subnetwork comprising one or more service processing nodes that are deployed in a distributed manner to form a blockchain network, the service processing apparatus comprising:
   at least one memory storing computer program code; and
   at least one processor configured to access the at least one memory and operate as instructed by the computer program code, the computer program code comprising:
   processing code configured to cause at least one processor to obtain authentication information of a service participant;
   generation code configured to cause at least one processor to determine whether data in the authentication information of the service participant is updated, and generate, based on the data in the authentication information of the service participant being updated, a notification message according to the updated data; and
   transmission code configured to cause at least one processor to transmit the notification message to the service processing node subnetwork, the notification message instructing the one or more service processing nodes in the service processing node subnetwork to process a service request according to updated authentication information of the service participant.

14. The service processing apparatus according to claim 13, wherein the transmission code is further configured to cause at least one processor to:
   determine a target service processing node, among the one or more service processing nodes, that fails to receive the notification message; and
   retransmitting the notification message to the target service processing node until the target service processing node receives the notification message or a number of transmission to the target service processing node reaches a predetermined threshold.

15. The service processing apparatus according to claim 14, wherein the transmission code is further configured to cause at least one processor to:

retransmitting the notification message to the target service processing node after a preset time period.

16. The service processing apparatus according to claim 15, wherein the preset time period is in a positive correlation with a number of times of retransmitting the notification message to the target service processing node.

17. The service processing apparatus according to claim 14, wherein the transmission code is further configured to cause at least one processor to:

transmit, based on the number of transmissions to the target service processing node reaching the predetermined threshold and the target service processing node failing to receive the notification message, a control instruction to a proxy node to the service processing node subnetwork to enable the proxy node to shield an external service capability of the target service processing node according to the control instruction.

18. The service processing apparatus according to claim 13, wherein the transmission code is further configured to cause at least one processor to:

detect states of the one or more service processing nodes in the service processing node subnetwork; and transmit, in a broadcasting manner, the notification message to service processing nodes in a normal state in the service processing node subnetwork.

19. The service processing apparatus according to claim 18, wherein the transmission code is further configured to cause at least one processor to:

transmit, in response to detecting that a service processing node in an abnormal state in the service processing subnetwork returning to the normal state, the notification message to the service processing node that returns to the normal state.

20. A non-transitory computer-readable storage medium storing at least one computer program code, the at least one computer program code, when executed by at least one processor of a processing node in a service processing node subnetwork of a blockchain network causes at least the processor to:

obtain authentication information of a service participant;

determine whether data in the authentication information of the service participant is updated;

generate, based on the data in the authentication information of the service participant being updated, a notification message according to the updated data; and transmit the notification message to a service processing node subnetwork, the notification message instructing one or more service processing nodes in the service processing node subnetwork to process a service request according to updated authentication information of the service participant, wherein the processing node is one of one or more processing nodes that are deployed in a distributed manner to form the blockchain network.

\* \* \* \* \*